United States Patent
Hwang et al.

(10) Patent No.: US 11,155,293 B2
(45) Date of Patent: Oct. 26, 2021

(54) DEVICE FOR STOWING STEERING WHEEL AND CONTROL METHOD THEREOF

(71) Applicants: Hyundai Motor Company, Seoul (KR); Kia Motors Corporation, Seoul (KR)

(72) Inventors: Sang Woo Hwang, Seoul (KR); Jai Hak Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/896,773

(22) Filed: Jun. 9, 2020

(65) Prior Publication Data

US 2021/0171088 A1 Jun. 10, 2021

(30) Foreign Application Priority Data

Dec. 4, 2019 (KR) .................. 10-2019-0159935

(51) Int. Cl.
*B62D 1/183* (2006.01)
*B62D 1/185* (2006.01)
(Continued)

(52) U.S. Cl.
CPC ............. *B62D 1/183* (2013.01); *B62D 1/181* (2013.01); *B62D 1/185* (2013.01); *B62D 3/12* (2013.01); *G05D 1/0061* (2013.01)

(58) Field of Classification Search
CPC ........ B62D 1/183; B62D 1/185; B62D 1/181; G05D 1/0061
See application file for complete search history.

(56) References Cited

U.S. PATENT DOCUMENTS

2018/0319420 A1* 11/2018 Huber .................. F16H 25/24
2018/0370559 A1* 12/2018 Swamidason .......... B62D 1/181
(Continued)

FOREIGN PATENT DOCUMENTS

DE         19705203 A1 * 8/1998 ............ B62D 1/181
DE     102019000035 A1 * 5/2019 ............ B62D 1/183
(Continued)

OTHER PUBLICATIONS

Kruetz, Daniel; 'Machine Translation of WO 2017009125 A1 Obtained Jul. 19, 2021'; Jan. 19, 2017; Entire Document (Year: 2017).*

*Primary Examiner* — Paul N Dickson
*Assistant Examiner* — Scott F. Underwood
(74) *Attorney, Agent, or Firm* — Mintz Levin Cohn Ferris Glovsky and Popeo, P.C.; Peter F. Corless (57) ABSTRACT

A device for stowing a steering wheel and a control method thereof are provided. The device includes a steering wheel module having a steering wheel and the steering wheel module is movable to an interior of a stowage space together with the steering wheel. A planetary gear set are provided and include a first rotational element connected to the steering wheel and selectively locked by a first braking element, a second rotational element connected to a reaction force motor, and a third rotational element selectively locked by a second braking element. A sliding unit is configured to slide the steering wheel module into the stowage space using rotational force received from the third rotational element.

14 Claims, 7 Drawing Sheets

(51) Int. Cl.
  *B62D 1/181* (2006.01)
  *G05D 1/00* (2006.01)
  *B62D 3/12* (2006.01)

(56) References Cited

U.S. PATENT DOCUMENTS

2019/0308662 A1    10/2019  Christiansen
2020/0070868 A1 *   3/2020  Patel ..................... B62D 1/183
2021/0124349 A1 *   4/2021  Koehler ................. B62D 5/006
2021/0171087 A1 *   6/2021  Hwang .................. B62D 1/183
2021/0188313 A1 *   6/2021  Kim ...................... B60W 10/10

FOREIGN PATENT DOCUMENTS

DE    102019213513 A1 *  5/2019  ............ B62D 1/183
JP         6596615 B1 * 10/2019  ............ B62D 1/181
KR      20210069996 A  *  6/2021  ............ B62D 1/183
WO    WO-2010094318 A2 *  8/2010  ............ B62D 1/181
WO    WO-2017009125 A1 *  1/2017  ............ B62D 1/185
WO    WO-2020152188 A1 *  7/2020  ............ B62D 5/006

* cited by examiner

DEVICE FOR STOWING STEERING WHEEL AND CONTROL METHOD THEREOF

CROSS-REFERENCE TO RELATED APPLICATION

This application claims priority to Korean Patent Application No. 10-2019-0159935, filed on Dec. 4, 2019, the disclosure of which is incorporated herein by reference.

BACKGROUND

1. Field of the Disclosure

The present disclosure relates to a device for stowing a steering wheel, which is capable of securing desired steering wheel stowage and deployment speeds while reducing cost and weight thereof, and a control method thereof.

2. Description of the Related Art

A steer-by-wire (SBW) system is a system in which steering is performed through connection between a steering wheel and front tires by an electrical signal without mechanical connection therebetween. The SBW system has an advantage in that tires is capable of being steered irrespective of rotation of a steering wheel and, therefore, may stow the steering wheel through movement of the steering wheel when the associated vehicle is autonomously driven in an autonomous mode. In particular, the seat space of the driver may be increased.

For a steering wheel stowing system, technologies such as a rotational stowing system and a linear stowing system have been developed. However, these technologies are adapted to move a steering wheel within a short distance and, therefore, have a limitation as to movement range thereof. As another steering wheel stowing system, a technology for moving a steering wheel through a stowing actuator has been developed. In this case, however, there may be a drawback in terms of a layout due to additional installation of the actuator. Accordingly, a space maximization effect, which is a main advantage of the SBW system, may be degraded.

Furthermore, when driving control management is shifted to the driver based on a system request during autonomous driving, steering by the driver should be enabled within a certain time (e.g., 4 seconds). However, smooth steering by the driver may be unable to be achieved since there is no system capable of rapidly deploying the stowed steering wheel. When the size of the actuator is increased to solve the above-mentioned problem, there may be problems in terms of weight and cost.

The above matters disclosed in this section are merely for enhancement of understanding of the general background of the disclosure and should not be taken as an acknowledgement or any form of suggestion that the matters form the related art already known to a person skilled in the art.

SUMMARY

Therefore, the present disclosure provides a device for stowing a steering wheel capable of securing desired steering wheel stowage and deployment speeds while reducing cost and weight thereof, and a control method thereof.

In accordance with an aspect of the present disclosure, a device for stowing a steering wheel may include a steering wheel module having a steering wheel, the steering wheel module being movable to an interior of a stowage space together with the steering wheel, a planetary gear set having a first rotational element connected to the steering wheel and selectively locked by a first braking element, a second rotational element connected to a reaction force motor, and a third rotational element selectively locked by a second braking element, and a sliding unit configured to slide the steering wheel module into the stowage space using rotational force received from the third rotational element.

The first rotational element of the planetary gear set may be a sun gear. The second rotational element of the planetary gear set may be a carrier. The third rotational element of the planetary gear set may be a ring gear. The sliding unit may include a rack gear disposed at an inner surface of the stowage space, which is formed in an interior of a vehicle and thus, the rack gear may extend in an axial direction of the steering wheel. The sliding unit may also include a pinion rotatably provided at the steering wheel module, the pinion being connected between the third rotational element and the rack gear in a gear engagement manner to be movable along the rack gear while rotating.

An idle gear may be engaged with a gear portion of the third rotational element. A worm gear may be provided to be coaxial with the idle gear. The worm gear may be engaged with the pinion. The pinion may be engaged with the rack gear such that the third rotational element and rack gear are connected in a gear engagement manner. The device may further include a telescopic motor configured to axially move the steering wheel.

Additionally, the device may include a controller configured to operate the reaction force motor in a state of releasing locking of the second braking element while locking the first braking element, when a stowage mode or a deployment mode for the steering wheel is requested, thereby causing the steering wheel module to slide by actuation force of the reaction force motor. When the stowage mode or the deployment mode for the steering wheel is requested, the controller may be configured to operate the telescopic motor to slide the steering wheel in a direction in which the steering wheel module is stowed or deployed.

In response to determining that stowage of the steering wheel is completed, the controller may be configured to lock the second braking element while maintaining locking of the first braking element. In response to determining that deployment of the steering wheel is completed, the controller may be configured to operate the reaction force motor in a state of releasing locking of the first braking element while locking the second braking element, to synchronize a steering angle of the steering wheel with a tire steering angle. In a driver steering mode, the controller may be configured to operate the reaction force motor in a state of releasing locking of the first braking element while locking the second braking element, to apply reaction force to the steering wheel.

In accordance with another aspect of the present disclosure, a method for controlling the steering wheel stowing device may include operating, by the controller, the reaction force motor in a state of releasing locking of the second braking element while locking the first braking element, when the stowage mode or the deployment mode for the steering wheel is requested, thereby causing the steering wheel module to slide by actuation force of the reaction force motor.

In response to determining that stowage of the steering wheel is completed, the second braking element may be locked in a state in which locking of the first braking element is maintained. Additionally, in response to determining that deployment of the steering wheel is completed, the reaction force motor may be operated in a state in which locking of the first braking element is released, and the second braking element may be locked, to synchronize a steering angle of the steering wheel with a tire steering angle. In the driver steering mode, the reaction force motor may be operated in a state of releasing locking of the first braking element while locking the second braking element, to apply reaction force to the steering wheel.

Through the above-described configurations, the present disclosure provides the following effects. In other words, stowage and deployment operations of the steering wheel may be rapidly performed by the reaction force motor which operates at a high torque. In particular, when an emergency deployment operation of the steering wheel is required, the reaction force motor may deploy the steering wheel together with the steering wheel module at high speed. Accordingly, operation of shifting driving control management to the driver during autonomous driving may be performed rapidly and safely.

In addition, since stowage and deployment operations of the steering wheel may be performed by the reaction force motor previously mounted to the steering system, it is unnecessary to additionally install a motor or actuator for stowage and deployment operations of the steering wheel. Accordingly, in particular, it may be possible to reduce cost and weight while maintaining a space maximization effect realized by the SBW system.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present disclosure, examples of which are illustrated in the accompanying drawings. Wherever possible, the same reference numbers will be used throughout the drawings to refer to the same or like parts.

The present disclosure is applicable to a vehicle having a steer-by-wire (SBW) system. The SBW system is configured to stow or deploy a steering wheel 12 using a reaction force motor 30 previously mounted to a steering system when stowage or deployment operation of the steering wheel 12 is requested.

Figure 1:
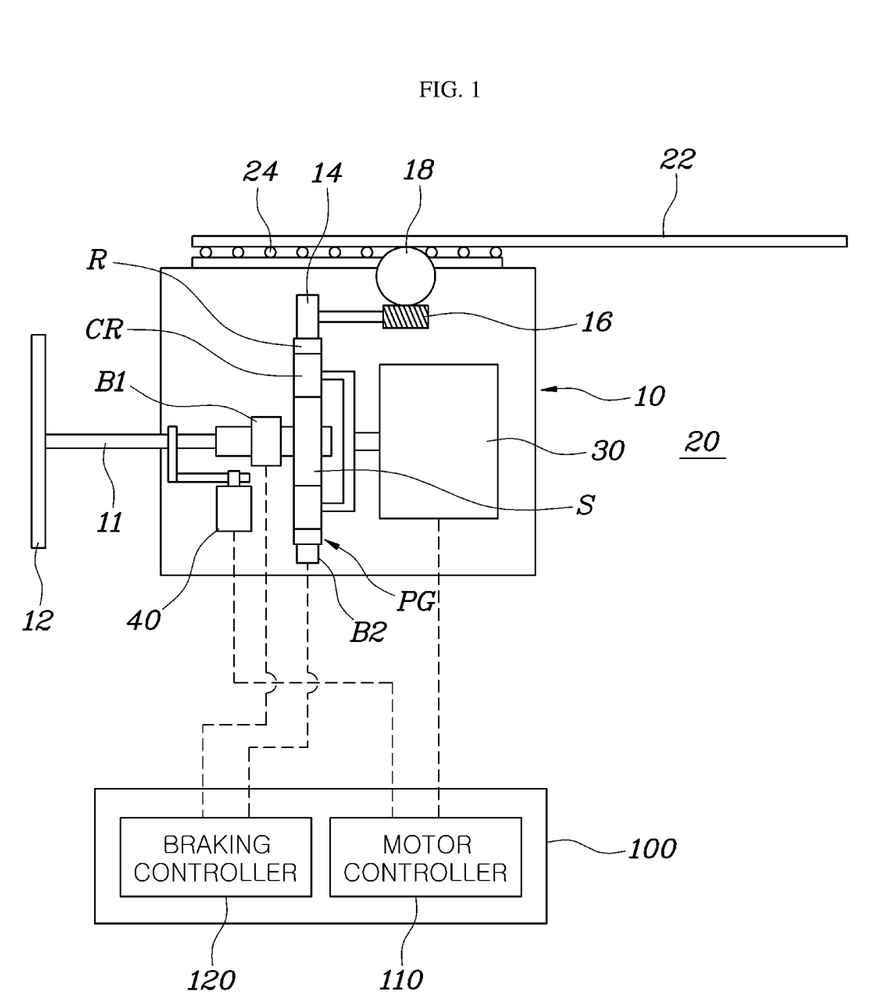
FIG. 1 is a view schematically showing the entire structure of a device for stowing a steering wheel in accordance with an exemplary embodiment of the present disclosure.

FIG. 1 is a view schematically showing the entire structure of a device for stowing the steering wheel 12 in accordance with the present disclosure. The steering wheel stowing device may include a steering wheel module 10, a planetary gear set PG, and a sliding unit. Referring to FIG. 1, the steering wheel module 10 may include the steering wheel 12. In particular, the steering wheel module 10 may be movable to an interior of a stowage space 20 together with the steering wheel 12. The stowage space 20 may be formed within an interior of a vehicle to extend in an axial direction of the steering wheel 12.

The planetary gear set PG may include three rotational elements, that is, first, second and third rotational elements tooth-engaged with one another to rotate together. The first rotational element may be connected to the steering wheel 12 (e.g., continuously connected), and may be locked by a first braking element B1. The second rotational element may be connected to the reaction force motor 30 (e.g., continuously connected). The third rotational element may be locked by a second braking element B2. For example, each of the first braking element B1 and the second braking element B2 may be a stopper configured to be operated by a solenoid. The first braking element B1 may be configured to limit rotation of a steering column 11, thereby braking the first rotational element. The second braking element B2 may be configured to be engageable with an outer tooth of the third rotational element, thereby braking the third rotational element.

Meanwhile, the sliding unit may be configured to slide the steering wheel module 10 into the stowage space 20 using rotational force received from the third rotational element. In other words, stowage and deployment operations of the steering wheel 12 may be rapidly performed by the reaction force motor 30 which operates at a high torque. In particular, when an emergency deployment operation of the steering wheel 12 is required, the reaction force motor 30 may be configured to deploy the steering wheel 12 together with the steering wheel module 10 at high speed. Accordingly, operation of shifting driving control management to the driver during autonomous driving may be performed rapidly and safely.

In addition, since stowage and deployment operations of the steering wheel 12 may be performed by the reaction force motor 30 previously mounted to the steering system, it is unnecessary to additionally install a motor or actuator for stowage and deployment operations of the steering wheel 12. Accordingly, it may be possible to reduce cost and weight while maintaining a space maximization effect realized by the SBW system.

Meanwhile, the planetary gear set PG may be a single-pinion planetary gear set. In particular, the first rotational element may be a sun gear S, the second rotational element may be a carrier CR, and the third rotational element may be a ring gear R. The sun gear S may be directly connected to the steering column 11 while being connected to the steering wheel 12 (e.g., continuously connected to the steering wheel). The carrier CR may be connected to the reaction force motor 30 (e.g. continuously connected). The ring gear R may be connected to the sliding unit to provide actuation force for stowage and deployment operations.

The individual elements of the planetary gear set PG are not limited to the above-described connection structures, and may be configured using other connections structures capable of stowing and deploying the steering wheel module 10. Meanwhile, the sliding unit may be configured to slide the steering wheel module 10 in the axial direction of the steering wheel 12. Referring to FIG. 1, a rack gear 22 may be installed at an inner surface of the stowage space formed in the interior of the vehicle to extend in the axial direction of the steering wheel 12.

In addition, a pinion 18 may be rotatably provided at the steering wheel module 10. The pinion 18 may be connected between the third rotational element and the rack gear 22 in a gear engagement manner and thus may be movable along the rack gear 22 while rotating. In particular, the gear engagement structure according to the above-described gear engagement manner may be a gear engagement structure including a worm gear 16 and a rack-and-pinion gear set. For example, an idle gear 14 may be engaged with outer teeth of the ring gear R.

Further, the worm gear 16 may be installed to be coaxial with the idle gear 14. The worm gear 16 may be engaged with the pinion 18. Accordingly, the ring gear R and the rack gear 22 may be connected in a gear engagement manner.

Particularly, the pinion 18 may operate as a worm wheel gear and may be configured to rotate by receiving rotational force from the worm gear 16. In other words, the ring gear R may be engaged with the idle gear 14, the worm gear 16 rotating together with the idle gear 14 may be engaged with the pinion 18, and the pinion 18 may be engaged with the rack gear 22. In accordance with such a gear engagement structure, when rotational force is transmitted from the ring gear R to the pinion 18, the pinion 18 may be rotated in a state of being engaged with the rack gear 22 and the steering wheel module 10 may thus be moved along the rack gear 22, thereby causing the steering wheel 12 to be stowed or deployed.

For reference, in accordance with the present disclosure, the planetary gear set PG and also the reaction force motor 30, may be included in the steering wheel module 10. Accordingly, the planetary gear set PG and the reaction force motor 30 may be configured to move together during movement of the steering wheel module 10. In addition, a guide structure using rollers 24 may be provided between an outer surface of the steering wheel module 10 and the inner surface of the stowage space 20 facing the outer surface of the steering wheel module 10. By the guide structure, the steering wheel module 10 may be slidable more smoothly.

Furthermore, the device of the present disclosure may include a telescopic motor 40 configured to axially move the steering wheel 12. For example, the telescopic motor 40 may be installed at the steering column 11. In accordance with operation of the telescopic motor 40, it may be possible to stow or deploy the steering wheel 12 in a direction of stowing or deploying the steering wheel module 10.

In other words, operation of stowing or deploying the steering wheel 12 may be possible based on operation of the telescopic motor 40, in addition to operation of stowing or deploying the steering wheel module 10 in accordance with operation of the reaction force motor 30. Thus, the steering wheel 12 may be stowed or deployed in a 2-step manner.

Figure 2:
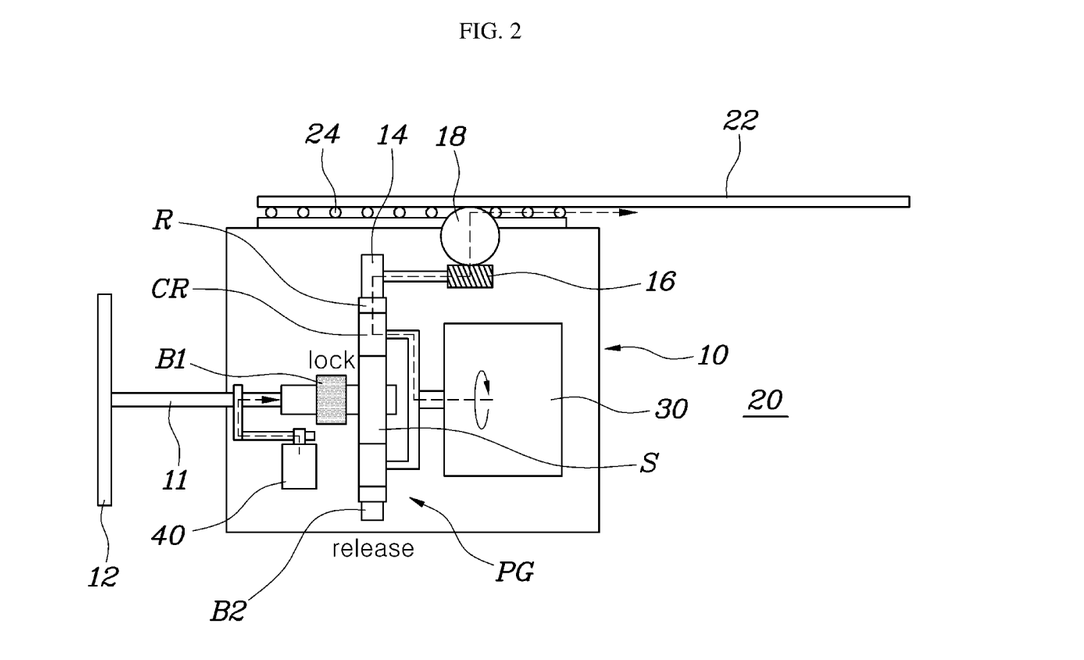
FIG. 2 is a view showing an actuation force path for operation of stowing a steering wheel module together with the steering wheel in accordance with an exemplary embodiment of the present disclosure.
Figure 4:
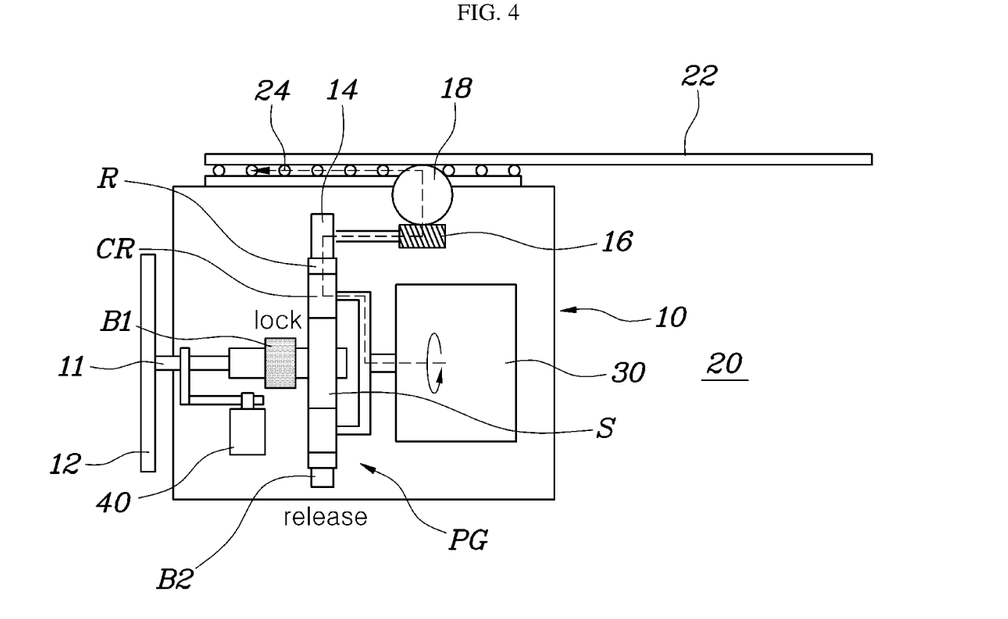
FIG. 4 is a view showing an actuation force path for operation of deploying the steering wheel module in accordance with an exemplary embodiment of the present disclosure.
Figure 5:
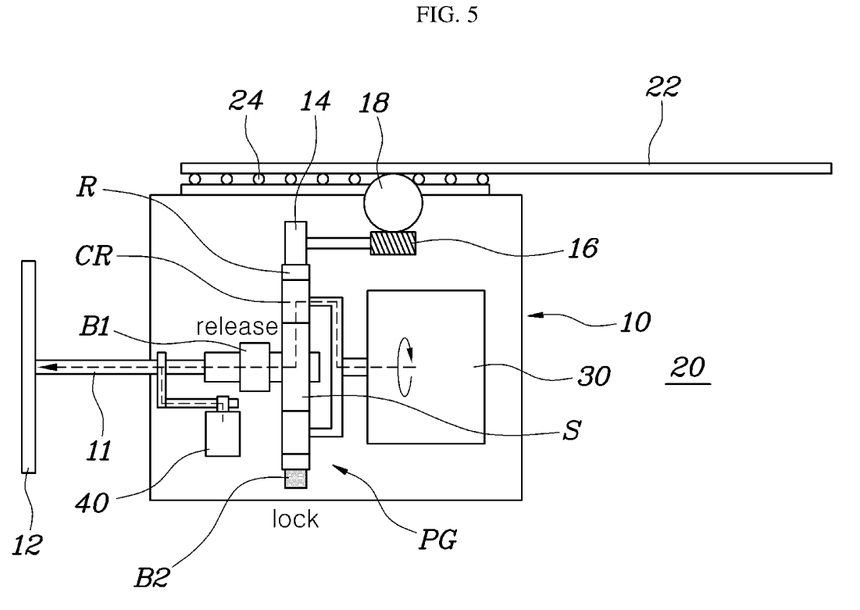
FIG. 5 is a view showing an actuation force path for operation of deploying the steering wheel in accordance with an exemplary embodiment of the present disclosure.

Meanwhile, FIG. 2 is a view showing an actuation force path for operation of stowing the steering wheel module 10 and the steering wheel 12 in accordance with the present disclosure. FIG. 4 is a view showing an actuation force path for operation of deploying the steering wheel module 10 in accordance with the present disclosure. FIG. 5 is a view showing an actuation force path for operation of deploying the steering wheel 12 in accordance with the present disclosure.

Referring to the drawings, when a stowage mode or a deployment mode for the steering wheel 12 is requested, a controller 100 may be configured to release locking of the second braking element B2, and lock the first braking element B1. In this state, the controller 100 may be configured to operate the reaction force motor 30 causing the steering wheel module 10 to slide by actuation force of the reaction force motor 30.

In other words, when the first braking element B1 is locked upon stowage of the steering wheel 12, the sun gear S may operate as a locking element. In this state, rotation in one direction applied to the carrier CR through the reaction force motor 30 may be transmitted to the pinion 18 via the carrier CR. As a result, the pinion 18 may be configured to rotate in one direction while engaged with the rack gear 22. Accordingly, it may be possible to axially slide the steering wheel module 10 toward the stowage space 20.

On the other hand, when the first braking element B1 is locked upon deployment of the steering wheel 12, the sun gear S may also operate as a locking element. In this state, rotation in an opposite direction applied to the carrier CR through the reaction force motor 30 may be transmitted to the pinion 18 via the carrier CR. As a result, the pinion 18 may be configured to rotate in the opposite direction while being engaged with the rack gear 22. Accordingly, it may be possible to axially slide the steering wheel module 10 in a direction away from the stowage space 20.

Thus, when the stowage or deployment operation of the steering wheel 12 is requested, operations of the telescopic motor 40, the first braking element B1 and the second braking element B2 as well as the reaction force motor 30 may be executed by the controller 100 and therefore, the stowage or deployment operation of the steering wheel 12 may be achieved. In particular, the controller 100 may include a motor controller 110 and a braking controller 120. The reaction force motor 30 and the telescopic motor 40 may be operated by the motor controller 110 and the first braking element B1 and the second braking element B2 may be operated by the braking controller 120.

In other words, in an exemplary embodiment of the present disclosure, the controller 100 may be embodied through a non-volatile memory (not shown) configured to store data as an algorithm configured to execute operation of various constituent elements of the vehicle or software commands to reproduce the algorithm, and a processor (not shown) configured to execute operations to be described hereinafter, using the data stored in the memory. The memory and the processor may be embodied as individual chips, respectively. Alternatively, the memory and the processor may be embodied as a single integrated chip. The processor may have a structure including one or more processors.

Meanwhile, FIG. 2 shows an actuation force path for stowage operation of the steering wheel 12 according to the present disclosure. Referring to FIG. 2, in response to receiving a stowage mode or a deployment mode request for the steering wheel 12, the controller 100 may be configured to operate the telescopic motor 40, thereby causing the steering wheel 12 to slide in a direction in which the steering wheel module 10 is stowed or deployed.

In other words, when the telescopic motor 40 operates in one direction upon stowage of the steering wheel 12, the steering column 11 may be reduced in length in a shrinkage direction, thereby causing the steering wheel 12 to slide in an axial direction toward the stowage space 20. On the other hand, when the telescopic motor 40 operates in an opposite direction upon deployment of the steering wheel 12, the steering column 11 may be increased length in an elongation direction, thereby causing the steering wheel 12 to slide in an axial direction away from the stowage space 20.

Figure 3:
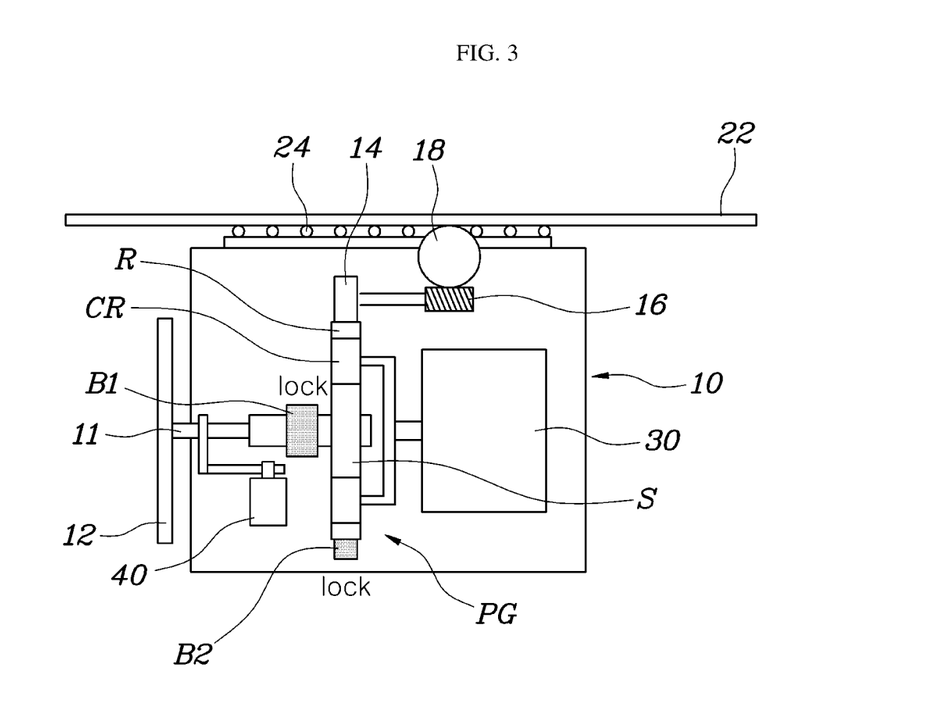
FIG. 3 is a view showing a state in which the steering wheel module and the steering wheel are stowed in accordance with an exemplary embodiment of the present disclosure.

Meanwhile, FIG. 3 is a view showing a state in which the steering wheel module 10 and the steering wheel 12 are stowed in accordance with the present disclosure. Referring to FIG. 3, in response to determining that stowage of the steering wheel 12 is completed, the controller 100 may be configured to lock the second braking element B2 while maintaining locking of the first braking element B1.

In other words, as both the first braking element B1 and the second braking element B2 perform braking, both the sun gear S and the ring gear R may operate as locking elements, respectively. Accordingly, even when the reaction force motor 30 operates, the rotational elements of the planetary gear set PG do not rotate and, as such, the stowed state of the steering wheel module 10 may be stably maintained.

Meanwhile, in FIG. 5, an actuation force path for synchronization of the steering wheel 12 is shown. Referring to FIG. 5, in response to determining that deployment of the steering wheel 12 is completed, the controller 100 be configured to operate the reaction force motor 30 in a state of releasing locking of the first braking element B1 while locking the second braking element B2, to synchronize a steering angle of the steering wheel 12 with a tire steering angle.

In other words, when the second braking element B2 is locked in a state in which deployment of the steering wheel 12 is completed, the ring gear R may operate as a locking element. Then, rotational force applied to the carrier CR through the reaction force motor 30 may be transmitted to the sun gear S via the carrier CR and, therefore, the steering angle of the steering wheel 12 connected to the sun gear S may be adjusted. Accordingly, the steering angle of the steering wheel 12 becomes equal to the tire steering angle before the operation mode of the steering wheel 12 is returned to a driver steering mode. Thus, steering manipulation of the driver may be safely performed at a time when the operation mode of the steering wheel 12 is returned to the driver steering mode in accordance with shift of driving control management.

Figure 6:
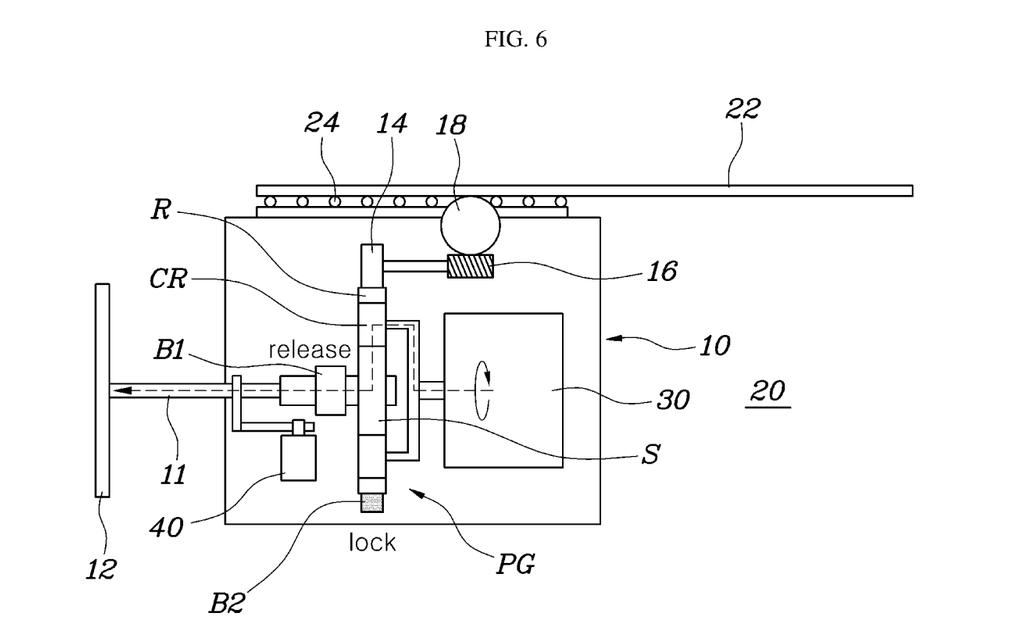
FIG. 6 is a view showing an actuation force path for application of steering reaction force to the steering wheel in a driver steering mode according to an exemplary embodiment of the present disclosure.

Meanwhile, FIG. 6 is a view showing an actuation force path for application of steering reaction force to the steering wheel 12 in the driver steering mode according to the present disclosure. Referring to FIG. 6, in the driver steering mode, the controller 100 may be configured to operate the reaction force motor 30 in a state of releasing locking of the first braking element B1 while locking the second braking element B2, to apply reaction force to the steering wheel 12.

In other words, the second braking element B2 may be in a locked state in the driver steering mode and, as such, the ring gear R may operate as a locking element. As a result, rotational force applied to the carrier CR through the reaction force motor 30 may be transmitted to the sun gear S via the carrier CR. Accordingly, steering reaction force may be applied to the steering wheel 12 connected to the sun gear S.

Meanwhile, in a method for controlling the device for stowing the steering wheel 12 in accordance with the present disclosure, it may be possible to operate, by the controller 100, the reaction force motor 30 in a state in which locking of the second braking element B2 is released, and the first braking element B1 is locked, in response to receiving a request for the stowage mode or the deployment mode for the steering wheel 12, thereby causing the steering wheel module 10 to slide by actuation force of the reaction force motor 30.

In response to determining that stowage of the steering wheel 12 is completed, it may be possible to operate, by the controller 100, the second braking element B2 to be locked in a state in which locking of the first braking element B1 is maintained. In addition, in response to determining that deployment of the steering wheel 12 is completed, it may be possible to operate, by the controller 100, the reaction force motor 30 in a state in which locking of the first braking element B1 is released, and the second braking element B2 is locked, to synchronize the steering angle of the steering wheel 12 with the tire steering angle. In the driver steering mode, it may be possible to operate, by the controller 100, the reaction force motor 30 in the state in which locking of the first braking element B1 is released, and the second braking element B2 is locked, to apply reaction force to the steering wheel 12.

Figure 7:
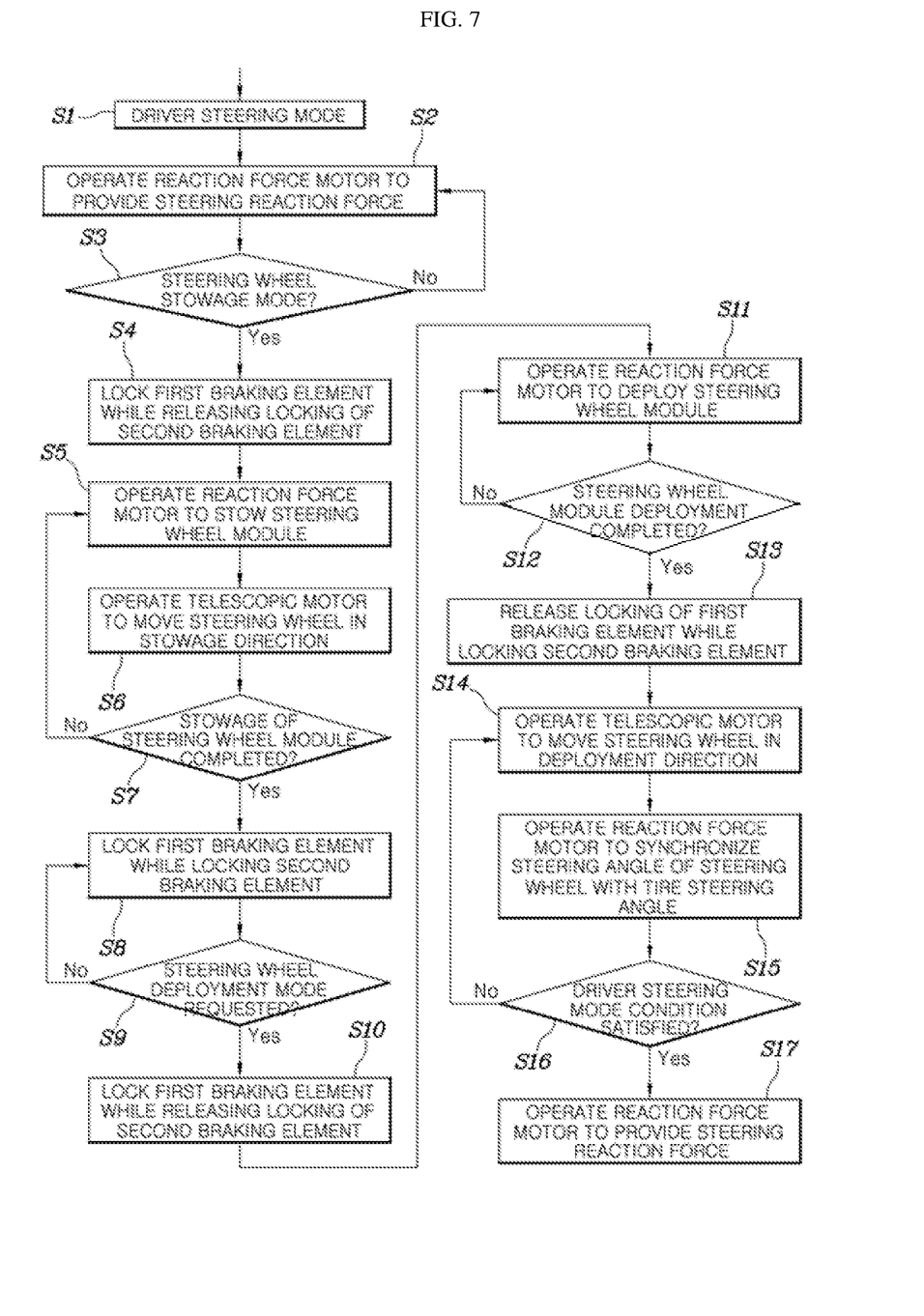
FIG. 7 is a flowchart showing stowage and deployment control procedures using the steering wheel stowage device according to an exemplary embodiment of the present disclosure.

Meanwhile, FIG. 7 is a flowchart showing stowage and deployment control procedures using the device for stowing the steering wheel 12 in accordance with the present disclosure. Hereinafter, procedures of stowing and deploying the steering wheel 12 will be described with reference to FIG. 7. First, when the driver drives the vehicle in the driver steering mode (S1), the second braking element B2 may be locked, thereby causing the ring rear R to be locked, as shown in FIG. 6. In addition, locking of the first braking element B1 may be released.

Accordingly, rotational force supplied from the reaction force motor 30 may be transmitted to the steering column 11 via the carrier CR and the sun gear S and therefore, steering reaction force against a steering input from the driver may be applied to the steering wheel 12 (S2). In such a driving situation, whether there is a request for shift to the steering wheel stowage mode may be determined (S3).

In response to determining, based on results of determination in S3, that there is a request for shift to the steering wheel stowage mode, the first braking element B1 may be locked, thereby causing the sun gear S to be locked, and locking of the second braking element B2 may be released (S4). As a result, rotational force supplied from the reaction force motor 30 may be transmitted to the idle gear 14 via the carrier CR and the ring gear R, thereby causing the idle gear 14 to rotate together with the worm gear 16. In accordance with rotation of the worm gear 16, the pinion 18 may be configured to rotate in one direction in a state in which the pinion 18 is engaged with the rack gear 22, thereby sliding the steering wheel module 10 toward the stowage space 20 (S5).

In addition, the telescopic motor 40 may be configured to operate to move the steering wheel 12 in a direction toward the stowage space 20 and, as such, stowage operation of the steering wheel 12 may be performed (S6). Thereafter, whether the steering wheel module 10 is completely stowed at a target position in the stowage space 20 may be determined (S7). This determination may be achieved through position control of the reaction force motor 30.

In response to determining in S7 that stowage of the steering wheel module 10 is completed, locking of the first braking element B1 may be maintained and the second braking element B2 may be locked, thereby causing the ring gear R to be locked, as shown in FIG. 3. Accordingly, rotation of the planetary gear set PG may be restricted (S8). On the other hand, whether a request for shift to the steering wheel deployment mode is received during driving in the steering wheel stowage mode as described above may be determined (S9).

In response to determining, based on results of determination in S9, that there is a request for the steering wheel deployment mode, the first braking element B1 may be locked, thereby causing the sun gear S to be locked, and locking of the second braking element B2 may be released, as shown in FIG. 4 (S10). As a result, rotational force supplied from the reaction force motor 30 may be transmitted to the idle gear 14 via the carrier CR and the ring gear R, thereby causing the idle gear 14 to rotate together with the worm gear 16. In accordance with rotation of the worm gear 16, the pinion 18 may be configured to rotate in the opposite direction in a state in which the pinion 18 is engaged with the rack gear 22, thereby sliding the steering wheel module 10 in a direction away from the stowage space 20 (S11).

Subsequently, whether the steering wheel module 10 is completely deployed at a target position outside the stowage space 20 may be determined (S12). In response to determining in S12 that deployment of the steering wheel module 10 is completed, locking of the first braking element B1 may be released and the second braking element B2 may be locked (S13), thereby causing the ring gear R to be locked, as shown in FIG. 5. In this state, the telescopic motor 40 may be configured to operate to axially move the steering wheel 12 in a direction away from the stowage space 20 and accordingly, the steering wheel 12 may be deployed to be in a state thereof before stowage (S14).

Further, the reaction force motor 30 may be configured to transmit rotational force supplied therefrom to the steering wheel 12 via the carrier CR and the sun gear S, thereby synchronizing the steering angle of the steering wheel 12 with the tire steering angle (S15). Thereafter, whether a driver steering mode condition is satisfied may be determined (S16). This determination may be achieved through determination as to whether the steering wheel module 10 and the steering wheel 12 are completely deployed, whether the steering wheel 12 is in a hand-on/off state, or the like. When the driver steering mode condition is not satisfied, the controller may be configured to output a notification to the driver. In response to determining in S16 that the driver steering mode condition is satisfied, rotational force supplied from the reaction force motor 30 may be transmitted to the steering column 11 via the carrier CR and the sun gear S and, as such, steering reaction force against a steering input from the driver may be applied to the steering wheel 12 (S17).

As described above, in accordance with the present disclosure, stowage and deployment operations of the steering wheel 12 may be rapidly performed by the reaction force motor 30 which operates at a high torque. In particular, when an emergency deployment operation of the steering wheel 12 is required, the reaction force motor 30 may be configured to deploy the steering wheel 12 together with the steering wheel module 10 at high speed. Accordingly, operation of shifting driving control management to the driver during autonomous driving may be performed rapidly and safely.

In addition, since stowage and deployment operations of the steering wheel 12 may be performed by the reaction force motor 30 previously mounted to the steering system, it is unnecessary to additionally install a motor or actuator for stowage and deployment operations of the steering wheel 12. Accordingly, in particular, it may be possible to reduce cost and weight while maintaining a space maximization effect realized by the SBW system.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A device for stowing a steering wheel, comprising:
   a steering wheel module including a steering wheel, wherein the steering wheel module is movable to an interior of a stowage space together with the steering wheel;
   a planetary gear set including a first rotational element connected to the steering wheel and selectively locked by a first braking element, a second rotational element connected to a reaction force motor, and a third rotational element selectively locked by a second braking element; and
   a sliding unit configured to slide the steering wheel module into the stowage space using rotational force received from the third rotational element.

2. The device according to claim 1, wherein the first rotational element of the planetary gear set is a sun gear, the second rotational element of the planetary gear set is a carrier, and the third rotational element of the planetary gear set is a ring gear.

3. The device according to claim 1, wherein the sliding unit includes:
- a rack gear provided at an inner surface of the stowage space, which is formed in an interior of a vehicle, wherein the rack gear extends in an axial direction of the steering wheel; and
- a pinion rotatably provided at the steering wheel module, wherein the pinion is connected between the third rotational element and the rack gear in a gear engagement manner and the pinion is movable along the rack gear while rotating.

4. The device according to claim 3, further comprising:
- an idle gear engaged with a gear portion of the third rotational element; and
- a worm gear provided to be coaxial with the idle gear, wherein the worm gear is engaged with the pinion; and
- wherein the pinion is engaged with the rack gear and the third rotational element and rack gear are connected in a gear engagement manner.

5. The device according to claim 1, further comprising:
- a telescopic motor configured to axially move the steering wheel.

6. The device according to claim 1, further comprising:
- a controller configured to operate the reaction force motor in a state of releasing locking of the second braking element while locking the first braking element, in response to receiving a request for a stowage mode or a deployment mode for the steering wheel to cause the steering wheel module to slide by actuation force of the reaction force motor.

7. The device according to claim 6, wherein in response to receiving the request for the stowage mode or the deployment mode for the steering wheel, the controller is configured to operate a telescopic motor configured to axially move the steering wheel to slide the steering wheel in a direction in which the steering wheel module is stowed or deployed.

8. The device according to claim 6, wherein, in response to determining that stowage of the steering wheel is completed, the controller is configured to lock the second braking element while maintaining locking of the first braking element.

9. The device according to claim 6, wherein, in response to determining that deployment of the steering wheel is completed, the controller is configured to operate the reaction force motor in a state of releasing locking of the first braking element while locking the second braking element, to synchronize a steering angle of the steering wheel with a tire steering angle.

10. The device according to claim 6, wherein, in a driver steering mode, the controller is configured to operate the reaction force motor in a state of releasing locking of the first braking element while locking the second braking element, to apply reaction force to the steering wheel.

11. A method for controlling the steering wheel stowing device according to claim 1, comprising:
- operating, by a controller, the reaction force motor in a state of releasing locking of the second braking element while locking the first braking element, in response to receiving the request for a stowage mode or a deployment mode to cause the steering wheel module to slide by actuation force of the reaction force motor.

12. The method according to claim 11, wherein, in response to determining that stowage of the steering wheel is completed, the second braking element is locked in a state in which locking of the first braking element is maintained.

13. The method according to claim 11, wherein, in response to determining that deployment of the steering wheel is completed, the reaction force motor operates in a state in which locking of the first braking element is released, and the second braking element is locked, to synchronize a steering angle of the steering wheel with a tire steering angle.

14. The method according to claim 11, wherein, in a driver steering mode, the reaction force motor operates in a state of releasing locking of the first braking element while locking the second braking element, to apply reaction force to the steering wheel.

* * * * *